A. J. OLING.
PNEUMATIC CUSHION FOR VEHICLES.
APPLICATION FILED JUNE 21, 1911.
1,023,868.
Patented Apr. 23, 1912.
3 SHEETS—SHEET 3.
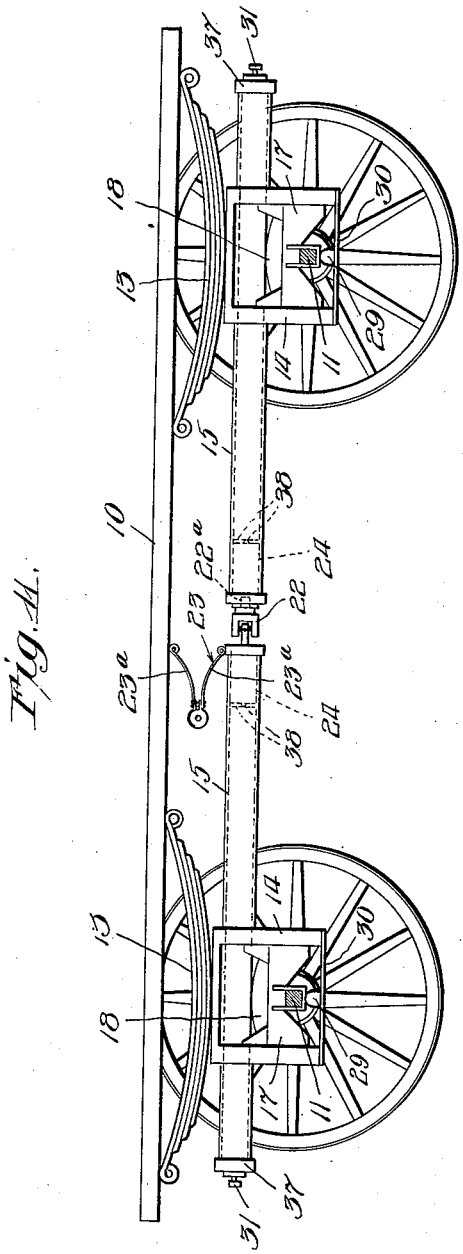

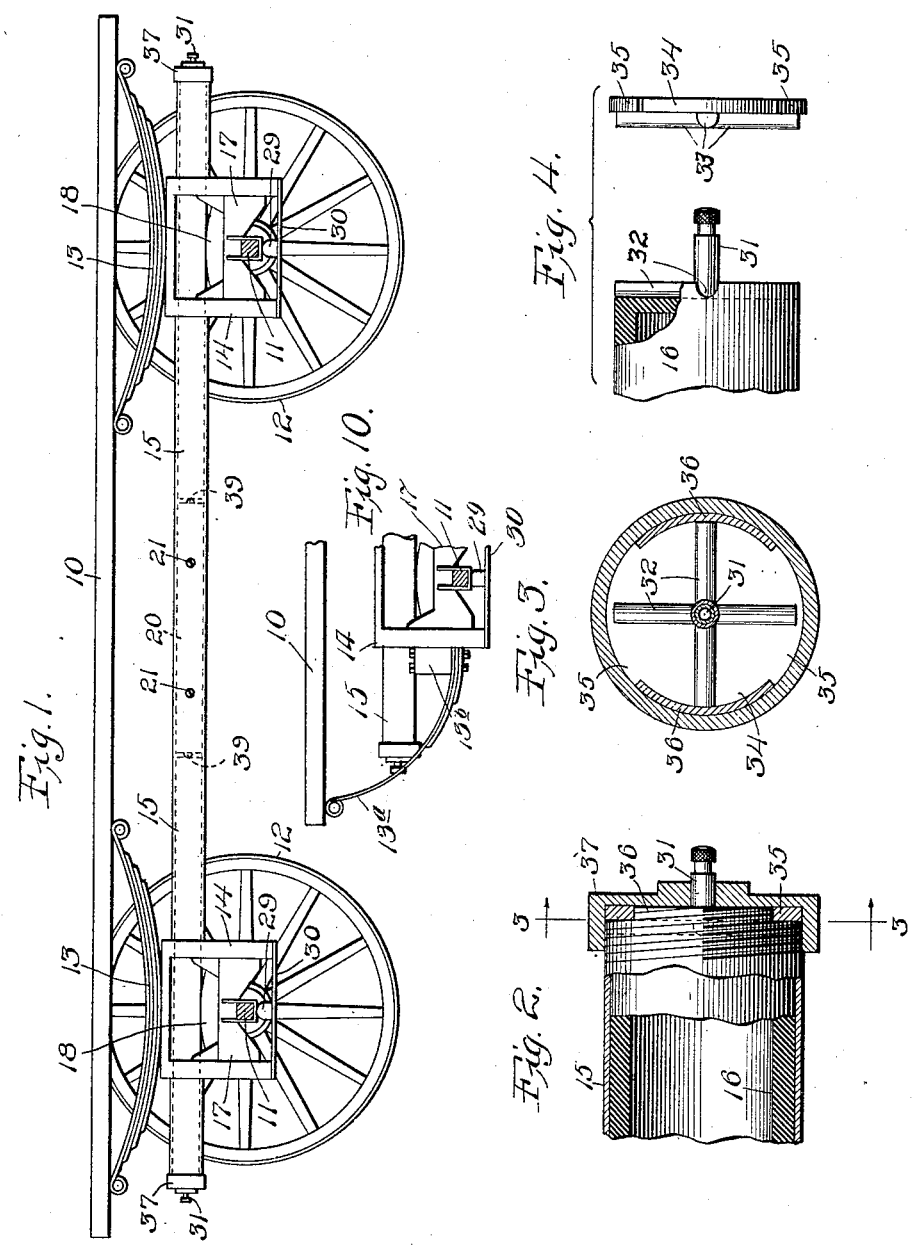

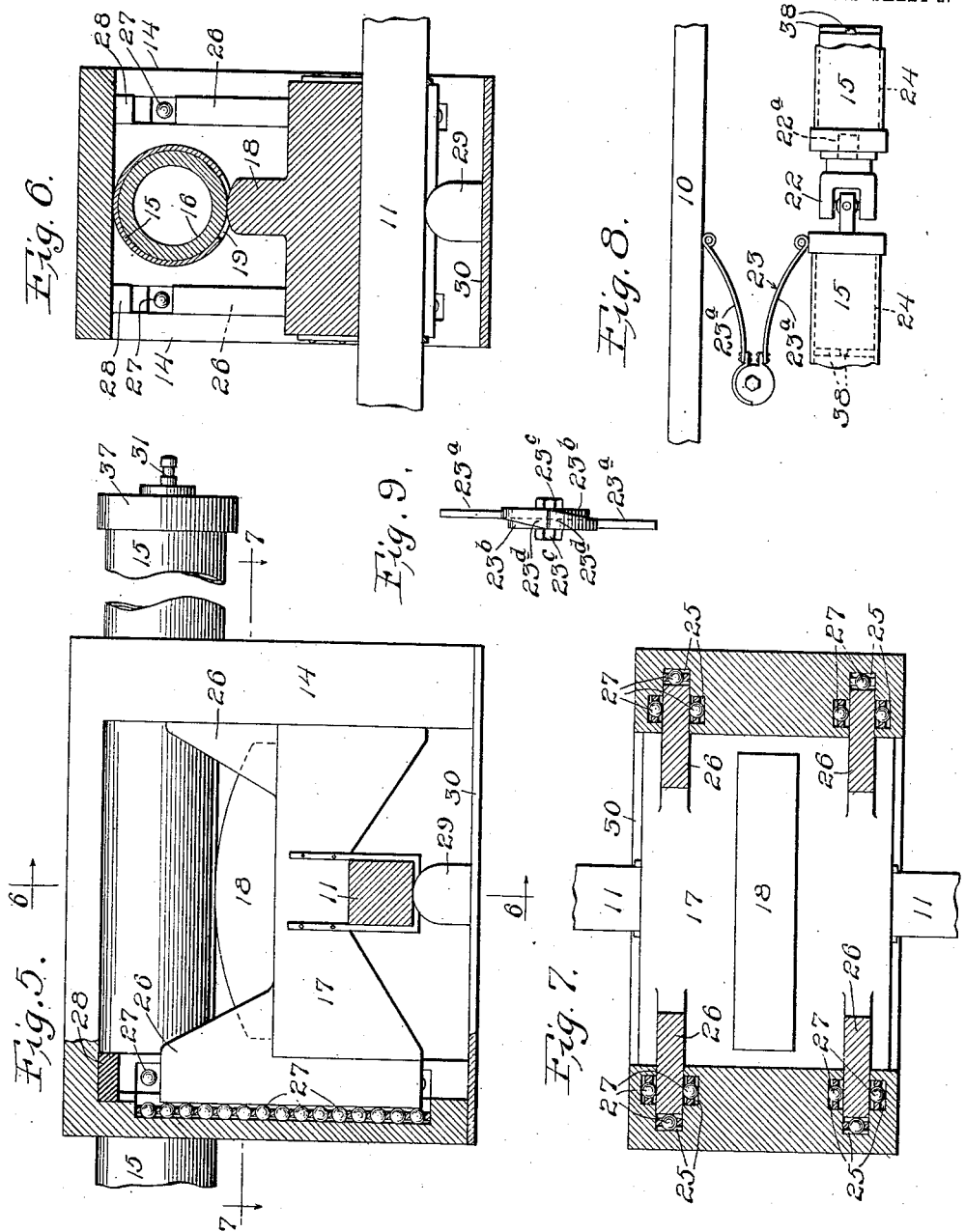

UNITED STATES PATENT OFFICE.

ABRAHAM J. OLING, OF CHICAGO, ILLINOIS, ASSIGNOR OF ONE-THIRD TO ISAAC KOMMERS, JR., OF CHICAGO, ILLINOIS.

PNEUMATIC CUSHION FOR VEHICLES.

1,023,868. Specification of Letters Patent. Patented Apr. 23, 1912.

Application filed June 21, 1911. Serial No. 634,646.

*To all whom it may concern:*

Be it known that I, ABRAHAM J. OLING, a citizen of the United States, residing at Chicago, in the county of Cook and State of Illinois, have invented certain new and useful Improvements in Pneumatic Cushions for Vehicles, of which the following is a specification.

The present invention relates to pneumatic cushions for vehicles by which the shocks to which the vehicle is subjected when in use on roadways are absorbed, or greatly reduced, before reaching the body of the vehicle.

The principal object of the invention is to provide a device of this character which shall absorb the shocks in a manner similar to that of pneumatic tired wheels.

Another object is to provide a device in which the cushion may be easily removed and replaced.

Other objects are to provide increased efficiency in operation, simplicity in construction, economy in manufacture, and ease of inspection and repair.

In carrying out my invention, I provide the face of the member which engages the cushion with a curvature approximating that of the wheels which may be used on the vehicle. I also provide novel means for preventing the pneumatic cushion from rotating in its casing and preferably join the casings, associated with the different wheels, by a universal joint so that they may move independently of each other in accordance with the positions of their associated axles.

These and other features and advantages will be best understood upon reference to the following detailed description taken in connection with the accompanying drawings, and the scope of the invention will be particularly pointed out in the appended claims.

In said drawings, Figure 1 is a side elevation of a portion of a vehicle constructed in accordance with my invention; Fig. 2 is a partial vertical section of one end of a cushion and its inclosing casing; Fig. 3 is a vertical section of the same taken on a plane indicated by the line 3—3 of Fig. 2; Fig. 4 is a view illustrating one end of the cushion and an associated member which coöperates in preventing the rotation of the cushion in its casing; Fig. 5 illustrates in side elevation the connection between an axle and its associated cushion and casing; Fig. 6 is a vertical section of the same taken on a plane indicated by the line 6—6 of Fig. 5; Fig. 7 is a horizontal section of the same taken on a plane indicated by the line 7—7 of Fig. 5; Fig. 8 illustrates the universal joint between two cushion casings and the associated yielding connection of the same to the frame or body of the vehicle; Fig. 9 is an end view of said yielding connection; Fig. 10 is a view illustrating a modified spring arrangement; and Fig. 11 is a view similar to Fig. 1 illustrating the universal joint construction of Fig. 8 applied to the structure of Fig. 1. This last figure illustrates the preferred embodiment of the invention.

Throughout these figures, like characters refer to like parts.

Referring to the drawing in detail, 10 designates the vehicle body, 11 the axles, and 12 the wheels of the same. Leaf-springs 13 connect the body 10 with guide frames 14, composed of suitable metal cast upon the tubular casings 15 of the cushions 16. The axles 11, in turn, are fixed to guide blocks 17, vertically movable in the guide frames 14 and carrying upwardly extending plungers 18 which pass through openings 19 in the under side of the casings 15 into engagement with the tubular cushion 16 located within these casings. The upper surface of each of the plungers 18, which engages the cushion 16, is provided with a curvature approximating that of the periphery of wheels which may be used on the axle, as the wheel 12. The tubular cushion 16 may be of any desired length and, in the form of the invention illustrated in Fig. 1, where the casings 15, 15, are formed of a single tube, the cushions 15, are separated by a spacer 20 of wood or other suitable material, properly secured to the inclosing tube, as by the screws 21.

In the form of the invention illustrated in Figs. 8 and 11, which is preferred, the casings 15 and 15, instead of being formed of a single tube, as in Fig. 1, are united by a universal joint 22 and are prevented from sagging by a yielding hanger 23 which unites one of the tubes to the body 10 of the vehicle. One of the members of this universal joint is connected to the end of its casing by a swivel connection, as at 22ª. This universal joint with its swivel connection allows for variations in positions of the axles 11, and the yielding hanger 23, being composed of suitable spring material, yieldingly holds the associated casings and prevents their sagging at the point of connection. The hanger 23 comprises two leaf springs 23ª secured at their separated ends to the body 10 and one of the casings 15 respectively and at their adjacent ends to two hinge disks 23ᵇ pivotally united by a bolt upon the ends of which are the nuts 23ᶜ. The disks 23ᵇ have co-acting abutting shoulders 23ᵈ which allow a limited movement of the body 10 and casings 15 without bringing the resilience of the springs 23ª into play, but which bring it into play when the limit is exceeded. Thus, if the parts are in the position of Figs. 8 and 9, the parts 10 and 15 might be moved toward each other without meeting the resisting action of the hanger but if, on the contrary, they are moved apart then such resistance would be encountered by reason of the springs 23ª being placed under tension. In this latter form of the invention, the inclosed cushions may also be of any desired length and suitable spacing blocks 24 may be accordingly located in the ends of the casings 15. Whether the tubular casings on each side of the vehicle be made from a single tube as in Fig. 1, or joined as in Figs. 8 and 11, they together extend throughout the length of the body or frame of the vehicle and may take the place of truss-rods in certain forms of vehicle construction. They are also positioned far enough away from the wheels to allow the front wheels to be turned sufficiently to properly direct the course of the vehicle when in use.

In the preferred construction of my invention, I cast the guide frames 14 upon the tubular casing 15 and provide the same with guide slots 25 in which extended vertical wings 26 upon the guide block 17 are adapted to move. Ball bearings 27 may also be provided at the ends and sides of the slots 25 so as to reduce friction. Blocks 28 of rubber, or other suitable resilient material, are located at the upper ends of the slots 25 to engage the wings 26 at the upper limit of their movement. A similar block 29 of rubber, or like material, is secured to the strip 30 uniting the lower ends of the guide frame 14 and engages the axle 11 at its lower limit of movement.

The cushion 16 is preferably tubular in shape and is composed of rubber and canvas constructed in any preferred manner and preferably reinforced at the points where the cushion is to be engaged by the plunger 18. It may be a single tube or be provided with an inner tube, as in the usual construction of pneumatic tires. The cushion is also designed to be inflated by air and to be held against rotation within the casing 15. Each cushion is provided at one end with an air connection 31 having the usual check valve through which air may be supplied to it from a pump or other compressed air source. It is likewise provided at its ends with intersecting grooves 32 which coöperate with intersecting ribs 33 upon an end member 34. The latter member is provided with peripheral projections 35 and the end of the casing 15 is provided with projections 36. The projections on the member 34 engage the spaces between the projections on the tubular casing 15, and vice versa. In this way, the member 34 is locked against rotation upon the casing 15, and when the cap 37 is screwed onto the end of the casing, the member 34 is held with its ribs 33 in engagement with the grooves 32 in the tubular cushion 16 and all parts are thus held against rotation. Similar grooves may be provided at the opposite end of the tubular cushions 16 and associated ribs provided upon the ends of the spacer block located at that end of the casing. Such ribs are shown upon the ends of the spacers 24 in Figs. 8 and 11 and are there designated 38, and in Fig. 1 upon opposite ends of the spacer 20 and are there designated 39.

From the description herein given, it will be seen that a solid tired wheel may be employed and that all shocks to it, by reason of its engaging obstacles in the roadway, will be transmitted through the axle, the associated guide blocks 17 and plungers 18 to the cushions located within the casings 15. A slight shock will cause the plunger 18 to move upward a short distance and, in so doing, it will meet with slight resistance from the cushion because of the relatively small portion of its curved bearing surface which will be brought into contact with the cushion. But increased shocks will cause increased movements of the plunger, with increased resistance offered on the part of the cushion. In other words, as the plunger moves against the cushion, the resistance it encounters is gradually increased the farther upward it moves. Thus, the mechanism adapts itself to the shocks applied. Slight shocks meet with slight resistance, whereas increased shocks meet with increased resistance. And in each instance, the resistance increases as the shock persists. Thus the resistance is graduated both according to the ultimate force of the shock and according to its rate of application.

I am aware that coöperating cushions and plungers have been proposed heretofore in the construction of vehicles, but in all such the area of engagement between the plunger and the cushion is practically constant for all positions of the plunger and the compression of the air without an increased plunger area is relied upon to resist the shocks. But I have provided for the more rapid increase in resistance by providing a plunger face which has a long flat arc of curvature—approximately that of the wheel of the vehicle as illustrated—so that the area of engagement between the plunger and cushion rapidly increases as the piston moves upward and vice versa. The resulting resistance is, therefore, dependent upon both the variation in available plunger area and the air pressure rather than the air pressure alone. I also provide for a comparatively sensitive action between the plunger and cushion by employing a cushion of sufficient dimensions to contain a relatively large body of air for coöperation with the relatively large plunger face. Because of this relation, the pressure of the air need not be so great as in the prior devices and consequently a more sensitive action is provided. It will also be apparent that with the universal joint construction of Figs. 8 and 11, the front and rear axles of the vehicle may occupy various positions without disturbing in any way the cushioning operation. And by having the cushions held against rotation in their casings, they may be kept in one position until considerably worn by the action of the associated plunger and they may then be turned end for end, or otherwise shifted, to bring a new wearing surface opposite the plunger. Obviously, those portions of the cushions which may be brought into wearing engagement with the plunger may be reinforced, while other portions may be made relatively light.

In Fig. 10 I have illustrated a modified spring arrangement, which I prefer to that of Fig. 1, and in which the leaf-spring 13 of Fig. 1 is replaced by leaf springs 13$^a$ (one only being illustrated) each secured at its outer ends to the body 10 and at its inner end to the under side of a block 13$^b$ formed integral with or secured to one side of the guide frame 14 in a position to bring the inner ends of the springs in substantial horizontal alinement with the axle 11.

It will be apparent to those skilled in the art that many alterations and modifications may be made in the details of the construction herein disclosed without departing from the spirit and scope of my invention. I, therefore, do not wish to be limited to such details, but aim to cover all such alterations and modifications by the terms of the appended claims.

What I claim as new and desire to secure by Letters Patent of the United States is:—

1. The combination of a vehicle body, a tubular casing extending lengthwise of said body and secured to the same, a guide frame secured to said casing and having a pair of guide ways on either side of said casing, an axle extending transversely of said body and casing, a wheel on said axle, a guide block secured to said axle and having a pair of guide wings on either side thereof for coöperative engagement with said guide ways, a tubular pneumatic cushion in said casing, and a plunger extending upward from the center of said guide block through an elongated opening in said casing into engagement with said tubular cushion, the face of the plunger thus engaging said cushion being long and narrow and extending lengthwise of said casing and being curved convexly in the direction of and throughout its length with a curvature approximating that of the periphery of said wheel.

2. The combination of a vehicle body, a tubular casing extending lengthwise of said body and secured to the same, a guide frame secured to said casing and having a pair of guide ways on either side of said casing, an axle extending transversely of said body and casing, a wheel on said axle, a guide block secured to said axle and having a pair of guide wings on either side thereof for coöperative engagement with said guide ways, rubber cushions at the upper ends of said guide ways for engagement by the upper ends of said wings, a rubber cushion on said guide block beneath said axle for engaging the latter upon the latter's reaching its lower limit of movement, a tubular pneumatic cushion in said casing, and a plunger extending upward from the center of said guide block through an elongated opening in said casing into engagement with said tubular cushion, the face of the plunger thus engaging said cushion being long and narrow and extending lengthwise of said casing and being curved convexly in the direction of and throughout its length with a curvature approximating that of the periphery of said wheel.

3. The combination of a vehicle body, a pair of tubular casings secured to said body at either side and extending lengthwise of the same, axles extending transversely of said body beneath the front and rear casings respectively, tubular pneumatic cushions in said casings, coöperating plungers on said axles for engaging said cushions through openings in said casings, and universal connections between the individual casings of each said pair.

4. The combination of a vehicle body, a pair of tubular casings secured to said body at either side and extending lengthwise of the same, axles extending transversely of said body beneath the front and rear casings respectively, tubular pneumatic cushions in said casings, coöperating plungers on said axles for engaging said cushions through openings in said casings, universal connections between the individual casings of each said pair, and a yielding connection between each said pair of casings and said body located in each instance adjacent to the associated universal connection.

5. The combination of a vehicle body, a pair of tubular casings secured to said body at either side and extending lengthwise of the same, axles extending transversely of said body beneath the front and rear casings respectively, tubular pneumatic cushions in said casings, coöperating plungers on said axles for engaging said cushions through openings in said casings, universal connections between the individual casings of each said pair, a leaf spring secured at one end to said body, a second leaf spring secured at one end to one of said casings near the associated universal connection, hinge disks secured to the other ends of said leaf springs, and pivoted together, and coöperating shoulders on said disks whereby the relative movement of said casings and body is unrestrained within certain limits and restrained when such limits are exceeded.

6. The combination of a vehicle body, a plurality of casings secured to said body, pneumatic cushions in said casings, axles, wheels on said axles, plungers connected to said axles and extending respectively through openings in said casings into engagement with said cushions, and a universal connection between those of said casings associated with different axles to permit relative movement of said axles.

7. The combination of a vehicle body, a plurality of casings secured to said body, pneumatic cushions in said casings, axles, wheels on said axles, plungers connected to said axles and extending respectively through openings in said casings into engagement with said cushions, a universal connection between those of said casings associated with different axles to permit relative movement of said axles, and means for yieldingly connecting said cushions with said body adjacent to said universal connection.

8. The combination with a vehicle body and axle, of cushioning means between said axle and body comprising a tubular casing, a pneumatic tubular cushion in said casing, and means comprising coöperating ribs and grooves at the end of said cushion for preventing its rotation relative to said casing.

9. The combination with a vehicle body and axle, of cushioning means between said axle and body comprising a tubular casing, a pneumatic tubular cushion in said casing, a cap at one end of said casing, and means comprising coöperating ribs and grooves upon said cap and cushion for preventing the rotation of the latter in said casing.

In witness whereof, I hereunto subscribe my name this 16th day of June, 1911.

ABRAHAM J. OLING.

Witnesses:
D. J. NORMOYLE,
L. M. ANDREW.

---

Copies of this patent may be obtained for five cents each, by addressing the "Commissioner of Patents, Washington, D. C."